June 22, 1926.
F. S. WOIDICH
FLOW METER TEST CUP
Filed June 6, 1921
1,589,418
2 Sheets-Sheet 1
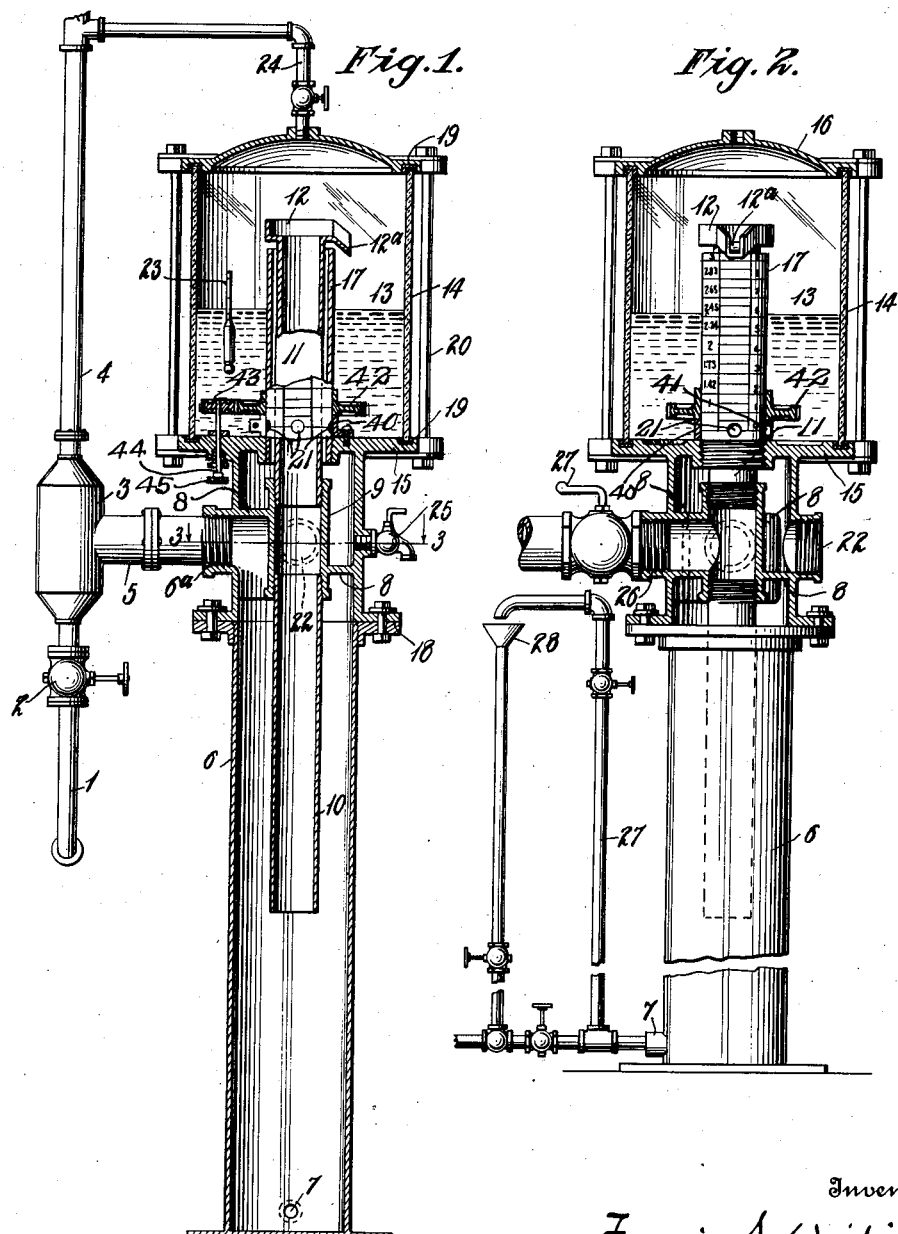
Inventor
Francis S. Woidich
By Byrnes Townsend Brickenstein
Attorneys June 22, 1926.
F. S. WOIDICH
FLOW METER TEST CUP
Filed June 6, 1921
1,589,418
2 Sheets-Sheet 2
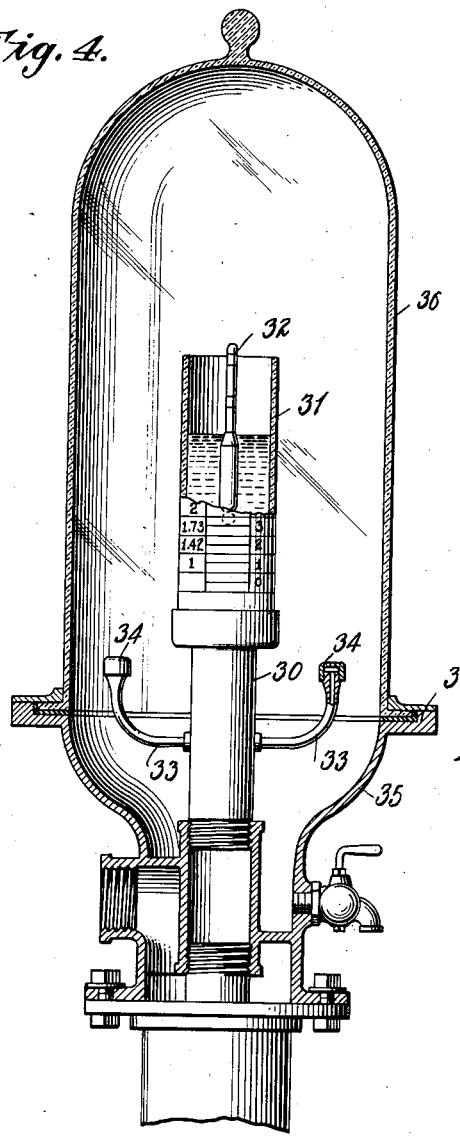
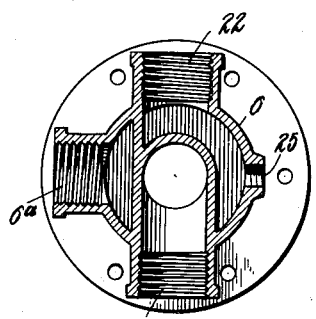
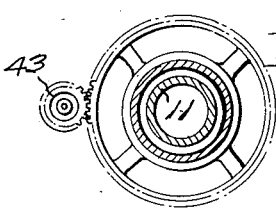
Inventor
Francis S. Woidich
By Byrnes Townsend Brickenstein
Attorneys Patented June 22, 1926.

1,589,418

UNITED STATES PATENT OFFICE.

FRANCIS S. WOIDICH, OF SAPULPA, OKLAHOMA.

FLOW-METER TEST CUP.

Application filed June 6, 1921. Serial No. 475,546.

The present invention relates to flow-test cups for determining the quantity of flow of distillate from a still and the rate of flow per hour.

The principal object of the invention is an apparatus of the character referred to which embodies in a simple manner instrumentalities and facilities for expeditiously and effectively determining all factors of interest to the stillman.

It is the particular object to provide apparatus which automatically indicates the quantity of flow of distillate and the rate of flow per hour, by direct reading; which affords a reliable indication of the specific gravity of the distillate, its temperature and which provides for immediate inspection of the product distilled as to color.

Other objects of the invention will appear from the description in connection with the accompanying drawings and the points of novelty will be particularly pointed out in the claims.

In the drawings—

Fig. 1 is a more or less diagrammatic representation in cross section of an apparatus embodying the invention;

Fig. 2 is a similar view taken at right angle to that in Fig. 1;

Fig. 3 is a section on line 3—3 Fig. 1;

Fig. 4 is a sectional view of a modified form; and Figs. 5 and 6 are fragmentary horizontal sections of the mechanism for varying the capacity of the flow meter shown in Figs. 1 and 2.

Having reference to Figs. 1 and 2, the distillate comes from the condenser (not shown) through the pipe 1, passes a regulating valve 2, enters the gas separator 3 in which air or uncondensable gases are separated from the condensate or distillate and caused to pass through pipe 4 either to the atmosphere or to a receiving vessel for further treatment, while the distillate and the water leave the gas separator through pipe 5 to enter the flow-meter apparatus proper.

The distillate enters through an inlet 6ª near the top of a tube 6 which constitutes in essence a reservoir or settling chamber for facilitating the separation of the water from the condensates, such as gasoline, kerosene, benzol, toluol, etc., which takes place due to the difference in specific weights. The water being heavier than gasoline, kerosene, etc. will settle down to the tube 6 where it can be continuously drawn off together with impurities through outlet 7.

The tube 6 has a partition wall 8 provided with a central duct 9 from which extends downwardly a pipe 10 and upwardly a pipe 11. The condensate being prevented by the partition wall from passing upwardly will enter through the bottom of pipe 10, flow upwardly through the duct 9 and pipe 11 and will be discharged at the upper end of the latter through a pan 12 having a flow snout 12ª into the flow-meter receiver 13. This receiver is formed by a glass cylinder 14, bottom 15, top 16 and graduated flow-scale cylinder 17. The latter is of larger diameter than pipe 11 and defines therewith an annular passage communicating with the upper part of tube 6.

In practice the bottom 15 and the upper part of the tube 6 including duct 9, the inlet 6ª and various outlets to be described later on may be formed in one piece and may be secured to the remaining section of tube 6 in any suitable way as by flanges 18. To provide a liquid-tight seal, the glass cylinder is preferably seated in packed grooves 19 in the bottom 15 and the top 16 and clamped between them by rods 20.

The flow scale cylinder 17 has orifices 21 through which the liquid can flow from the receiver 13 through the annular space between the latter and pipe 11 into the upper part of tube 6 and through an outlet 22 to a distributing header (not shown) to the usual run-down tank to be stored.

The amount of distillate or condensate passing a certain size orifice is of course directly proportional to $\sqrt{2gh}$, indirectly proportional to the co-efficient of resistance (of orifice etc.) and the degree of viscosity of the distillate, which latter two factors can be determined empirically. The factor "$h$" in $\sqrt{2gh}$, represents the hydrostatic head of the distillate calculated from center of orifice to the liquid level of the distillate in the receiver 13, while "$g$" is the acceleration of gravity $=9.81$ meter/second.

It is therefore easy to compute from the above data for each hydrostatic head "$h$" the corresponding amount of condensate passing through the orifices 21 of the flow scale cylinder. The flow scale on the cylinder 17 can thus be properly graduated to indicate for each level of the liquid the number of gallons of distillate per hour as indicated in Fig. 2.

By providing means for varying the capacity of the flow meter, the rate of flow may be easily read even when the quantity is comparatively small. As the hydrostatic head of the distillate for a given rate of flow is dependent upon the size of the orifice, the capacity may be varied by changing the dimensions of the orifice. One construction which I have found to be efficient for this purpose is illustrated in Figs. 1, 2, 5 and 6. A sleeve 40 which is fixed to the bottom 15 is provided with an opening 41 and the flow scale cylinder carries a gear 42 meshing with a gear 43 which is mounted upon shaft 44. As the operating knob 45 of the shaft 44 is located outside of the test cup, the stillman may readily change the capacity of the flow meter without disconnecting the flow meter by rotating the flow scale cylinder 17 to bring the desired orifice 21 into alignment with the opening 40. A separate scale is provided for each orifice 21 and packing, not shown, is employed to confine the flow to the particular orifice which is in actual use. If the cylinder 17 is so positioned that no orifice is in alignment with the opening 41, the device will not be damaged as the distillate may overflow the upper end of the cylinder 17.

The stillman is thus enabled to read instantly at each moment the rate of flow per hour and is therefore enabled to conduct the distillation and extraction of distillate efficiently and intelligently at the rated and most favorable capacity of his still or continuous rectifying and distilling apparatus.

The distillate within the receiver 13 is conveniently exposed for color tests, the glass cylinder being colorless for that purpose.

Temperature and specific gravity may be easily and accurately determined by means of a combined hydrometer and thermometer 23 freely floating in the annular space between the glass cylinder 14 and the flow-scale tube 17. The distillate being drawn off from the bottom and renewed from the top will be quiet and steady and thus afford a reliable reading of gravity and temperature and particularly the quantity.

The top 16 is provided with a vent pipe 24 to avoid accumulation of gases in the receiver 13. The removal of gases and vapors by means of pipe 4 and again by pipe 24 avoids errors and fluctuations which would otherwise result.

Samples for laboratory examination of the distillate can be withdrawn by means of test cock 25 from the space above the partition wall 8 in tube 6.

In case of repair work on the flow-meter or breaking of the glass cylinder 14 a by-pass is provided by the outlet 26 controlled by a valve 27. The outlet leads directly from the duct 9 through tube 6 to the outside and is normally closed. When the valve is open, the distillate and water will be separated as before and the distillate will pass through pipe 10 into duct 9 and then through the outlet 26 directly to the distributing header and storage tanks.

The water drawn off at the bottom of tube 6 passes through the outlet 7 into the riser 27 and is discharged in a downward stream into a funnel 28 and flows from there to a well or is disposed of in any desired manner. As the liquid flows into the funnel it is conveniently exposed to observation as to color or other physical conditions.

The length of the tube 6 may be longer or shorter, according to the gravity and degree of viscosity of the distillate run to effect perfect separation of the water from the distillate.

It is understood that within the broader aspect of the invention various changes may be made.

One modification which I have particularly in mind is shown in Fig. 4. In this form the liquid to be tested rises through pipe 30 at the top of which is mounted a graduated glass cylinder 31 within which floats the combined hydrometer and thermometer 32. The pipe 30 is provided with one or more flow tubes 33 controlled by an orifice at their ends. I prefer to use means for varying the size of the effective orifice. This may be accomplished in a number of well known ways. As a simple and effective means in that direction, I suggest the use of a plurality of caps 34 having different sized orifices, any one of which may be attached, at will, to the pipe 33.

The rate of flow may thus be controlled and determined. The scale is shown graduated for two different sized orifices. It is obvious, however, that it may be graduated for any desired number of orifices, if desired and in practice that orifice will be used which corresponds to the conditions of a particular still or to a still under particular conditions, as the case may be.

The distillates flow from the pipe or pipes 33 into a bowl 35 to which is secured the glass bell 36 by means of flanges 37. The glass bell may be provided with a gas vent which may advantageously be a pipe rising from the metal bowl 35 and in communication with the air or a gas collector as desired.

The operation and mode of use of this form of apparatus is similar to that shown in Figs. 1 and 2.

I claim:

1. Apparatus for testing liquids, comprising a closed reservoir having transparent walls, a conduit extending through the bottom upwardly in the reservoir to near the top thereof for feeding liquid into the reservoir, means for withdrawing liquid from near the bottom thereof and means operable from without the reservoir for controlling the withdrawing means.

2. Apparatus for testing liquids, comprising a closed reservoir having transparent walls, a conduit extending through the bottom upwardly in the reservoir to near the top thereof, means for withdrawing liquid from near the bottom thereof, comprising a tube surrounding said conduit and provided with lateral apertures near the bottom of the reservoir, and means operable from without the reservoir for varying the effective size of the apertures.

3. Apparatus for testing the flow of liquids, comprising a closed reservoir having transparent walls, an inlet for the liquid, an outlet for the liquid below the inlet, means connected with the inlet for separating gases from the liquid before it passes to the inlet and a gas vent through the top of the reservoir.

4. Apparatus for testing distillates, comprising a closed reservoir having transparent walls, an outlet for the liquid, an inlet above the outlet, means connected with the inlet for separating gases from the liquid before it passes to the reservoir and means connected with the inlet for separating water from the distillate before it passes to the reservoir.

5. Apparatus for testing liquids, comprising a vessel having transparent walls and an aperture in its bottom, a tubular element having a liquid-tight fit in said opening and extending upwardly from the bottom, a pipe of smaller diameter than said tubular body extending therethrough beyond the upper end thereof, said tubular body having an orifice near its lower end, and means for passing the liquid to be tested upwardly through the pipe, the said orifice being of such size as to cause the formation of a liquid head in the vessel.

6. Apparatus for testing liquids, comprising a vessel having transparent walls and an aperture in its bottom, a tube extending downwardly from the bottom of the vessel and being closed at its lower end to act as a settling chamber, a tubular element having a liquid-tight fit in said opening and extending upwardly from the bottom of the vessel, a pipe of smaller diameter than the tubular element extending from the lower portion of the said tube upwardly through said tubular element beyond the upper end thereof and having an overflow snout, the tubular element having an orifice near its lower end, a partition wall extending transversely of the pipe near its upper end, an inlet for the liquid below the partition wall and an outlet above the partition wall, the said orifice being of such size as to cause the formation of liquid head in the vessel.

7. Apparatus for testing liquids, comprising a vessel having transparent walls and an aperture in its bottom, a tube extending downwardly from the bottom of the vessel and being closed at its lower end to act as a settling chamber, a tubular element having a liquid-tight fit in said opening and extending upwardly from the bottom of the vessel, a pipe of smaller diameter than the tubular element extending from the lower portion of the said tube upwardly through said tubular element beyond the upper end thereof and having an overflow snout, the tubular element having an orifice near its lower end, a partition wall extending transversely of the tube near its upper end, an inlet for the liquid into the tube below the partition, an outlet from the tube above the partition wall, an outlet conduit leading from the pipe below the bottom of the vessel through the tube and means for controlling the same, the orifice being of such size as to cause the formation of a liquid head in the vessel and the tubular element being graduated relatively to the level of the liquid to indicate the rate of flow of the liquid.

8. Apparatus for testing liquids, comprising a tube adapted to act as a settling chamber, a transverse partition in the tube near the upper end thereof, an inlet below the partition, an outlet above the partition, a pipe extending from below the partition upwardly therethrough and means having fluid connection with the upper end of the pipe for indicating the rate of flow of the liquid to be tested.

9. Apparatus for testing distillates carrying water, comprising a tube sufficiently high to effect separation of the water from the distillate by gravity settling, a transverse partition, an outlet above the partition, a pipe extending from below the partition upwardly therethrough and means having fluid connection with the upper end of the pipe for indicating the rate of flow of the distillate to be tested.

10. Apparatus for testing liquids, comprising a transparent vessel, means for passing the liquid to be tested to the vessel, means for draining the liquid from the vessel including an orifice of such size as to cause the formation of a liquid head above it, means for varying the effective aperture of the orifice and a hydrometer in the vessel.

11. Apparatus for testing liquids, comprising a tube adapted to act as a settling chamber, a transverse partition in the tube near the upper end thereof, an inlet below the partition, an outlet above the partition, a pipe extending from below the partition upwardly therethrough, means having fluid connection with the upper end of the pipe for indicating the rate of flow of the liquid to be tested, means at the bottom of the tube for withdrawing liquid therefrom and means for exposing the liquid during the withdrawal to observation.

12. Apparatus for testing liquids comprising a tube adapted to act as a settling chamber, a transverse partition in the tube near the upper end thereof, an inlet below the partition, an outlet above the partition, a pipe extending upwardly through the said partition, an outlet conduit leading from the pipe through the wall of the tube and means having fluid connection with the upper end of the pipe for indicating the rate of flow of the liquid to be tested.

In testimony whereof, I affix my signature.

FRANCIS S. WOIDICH.